United States Patent [19]
Laubach

[11] Patent Number: 5,895,064
[45] Date of Patent: Apr. 20, 1999

[54] UNIVERSAL MOUNTING BRACKET FOR RUNNING BOARDS

[76] Inventor: Daniel J. Laubach, R.R. 4, N. Hwy. 77 P.O. Box 1408, Fremont, Nebr. 68026

[21] Appl. No.: 08/819,733

[22] Filed: Mar. 18, 1997

[51] Int. Cl.[6] .............................. B60R 3/00; F16M 11/00
[52] U.S. Cl. ........................................ 280/163; 248/205.1
[58] Field of Search ............................ 280/847, 848, 280/154, 851, 854, 163, 164, 164.1; 248/205.1

[56] References Cited

U.S. PATENT DOCUMENTS

| | | | |
|---|---|---|---|
| 10,262 | 4/1853 | Marz | 280/11.2 |
| 89,759 | 5/1869 | Gosling | 280/847 |
| 90,584 | 5/1869 | Roberts | 280/847 |
| D. 284,752 | 7/1986 | Horton, Jr. | D12/203 |
| D. 349,678 | 8/1994 | Waddington et al. | D12/203 |
| 1,266,938 | 5/1918 | Hassler | 280/163 |
| 1,439,481 | 12/1922 | Prehn | 280/163 |
| 1,542,803 | 6/1925 | Evans | 280/163 |
| 1,547,334 | 7/1925 | Leavitt | 280/847 |
| 2,022,421 | 11/1935 | King | 280/847 |
| 2,261,377 | 11/1941 | Jandus | 280/847 |
| 2,326,720 | 8/1943 | Strauch | 280/847 |
| 2,383,428 | 8/1945 | Ulrich | 280/847 |
| 3,857,605 | 12/1974 | Fantoni | 297/162 |
| 3,929,078 | 12/1975 | Sears | 104/111 |
| 4,017,093 | 4/1977 | Stecker, Sr. | 280/163 |
| 4,057,183 | 11/1977 | Ness | 224/42.45 |
| 4,088,292 | 5/1978 | Emminger | 248/205 R |
| 4,139,972 | 2/1979 | Naka | 52/208 |
| 4,311,320 | 1/1982 | Waters, Jr. | 280/163 |
| 4,405,141 | 9/1983 | Jurek | 280/163 |
| 4,456,275 | 6/1984 | Snyder et al. | 280/163 |
| 4,623,113 | 11/1986 | Studebaker | 248/311.2 |
| 4,825,975 | 5/1989 | Symes | 182/92 |
| 5,193,829 | 3/1993 | Holloway et al. | 280/163 |
| 5,265,896 | 11/1993 | Kravitz | 280/163 |
| 5,286,049 | 2/1994 | Khan | 280/169 |
| 5,511,750 | 4/1996 | Evenson | 280/200 |
| 5,803,475 | 9/1998 | Dick | 280/163 |

FOREIGN PATENT DOCUMENTS 810113  3/1979  Canada .............................. 280/847

*Primary Examiner*—Lanna Mai
*Assistant Examiner*—Bridget Avery
*Attorney, Agent, or Firm*—Koley, Jessen, Daubman & Rupiper, P.C.; Mark D. Frederiksen

[57] ABSTRACT

A universal mounting bracket includes a pair of upper and lower generally L-shaped legs connected together along their backs to permit slidable length adjustment between the upper and lower feet of the legs. A hanger is connected to the back and secured to an inward surface of a rocker panel to support the hanger with the upper foot in contact with the vehicle floor board and the lower foot projecting horizontally outwardly from below the rocker panel to support a running board thereon. The upper and lower legs of the bracket have the feet connected to the back portion at an angle greater than 90° relative to the horizontal, such that adjustment of the length of the backs will move the lower foot both horizontally and vertically relative to the upper foot. A running board is secured to the lower foot of the bracket, and has a back wall which is secured to the bottom wall of the rocker panel.

9 Claims, 2 Drawing Sheets

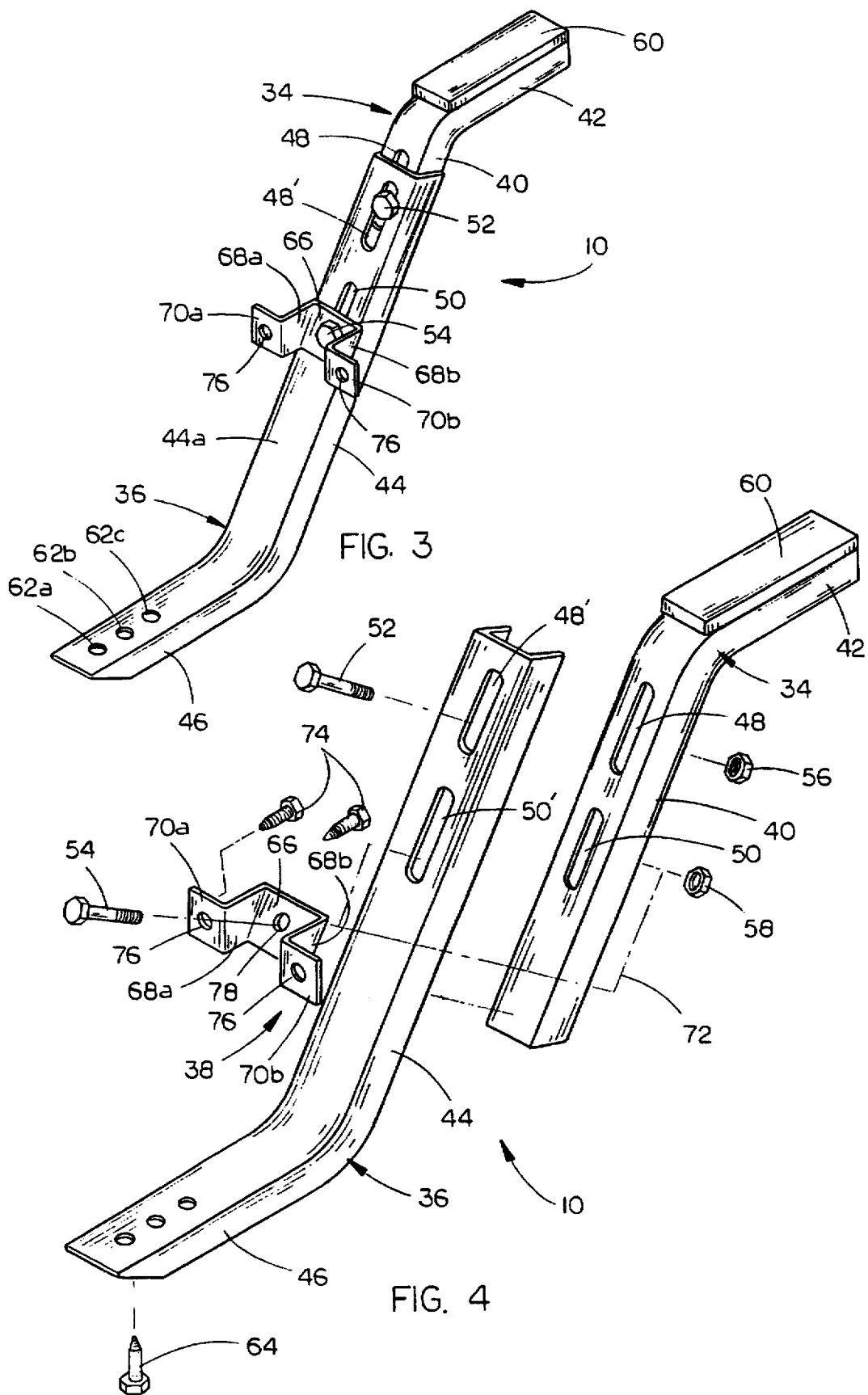

5,895,064

UNIVERSAL MOUNTING BRACKET FOR RUNNING BOARDS

TECHNICAL FIELD

The present invention relates generally to running boards for vehicles, and more particularly to a bracket support system for removably mounting various running boards to a variety of vehicles.

BACKGROUND OF THE INVENTION

Running boards are a popular accessory item for many vehicles, particularly pickup trucks. Not only do the running boards provide a pleasing appearance to the vehicle, but they also protect the sides and rocker panels from rocks and gravel thrown from the vehicle tires.

Because of the wide variety of makes and styles of vehicles, as well as a variety in the styles and types of running boards, it is typically quite difficult for a supplier of running boards to maintain a stock of all of the appropriate mounting hardware to attach a particular style running board to a particular make of vehicle. While there are a variety of running board mounting systems which permit adjustment, these mounting systems typically require separate adjustment of vertical and horizontal straps.

SUMMARY OF THE INVENTION

It is therefore a general object of the present invention to provide an improved support bracket for running boards.

Another object of the present invention is to provide a universal bracket for a running board which may be attached to a wide variety of vehicle makes and running board styles.

Still another object is to provide a running board universal bracket which is simple to install and economical to manufacture.

These and other objects of the present invention will be apparent to those skilled in the art.

The universal mounting bracket of the present invention includes a pair of upper and lower generally L-shaped legs connected together along their backs to permit slidable length adjustment between the upper and lower feet of the legs. A hanger is connected to the back and secured to an inward surface of a rocker panel to support the hanger with the upper foot in contact with the vehicle floor board and the lower foot projecting horizontally outwardly from below the rocker panel to support a running board thereon. The upper and lower legs of the bracket have the feet connected to the back portion at an angle greater than 90° relative to the horizontal, such that adjustment of the length of the backs will move the lower foot both horizontally and vertically relative to the upper foot. A running board is secured to the lower foot of the bracket, and has a back wall which is secured to the bottom wall of the rocker panel.

BRIEF DESCRIPTION OF THE DRAWINGS

FIG. 3 is a perspective view of the bracket of the present invention; and

FIG. 4 is an exploded perspective view of the universal bracket.

DESCRIPTION OF THE PREFERRED EMBODIMENT

Figure 1:
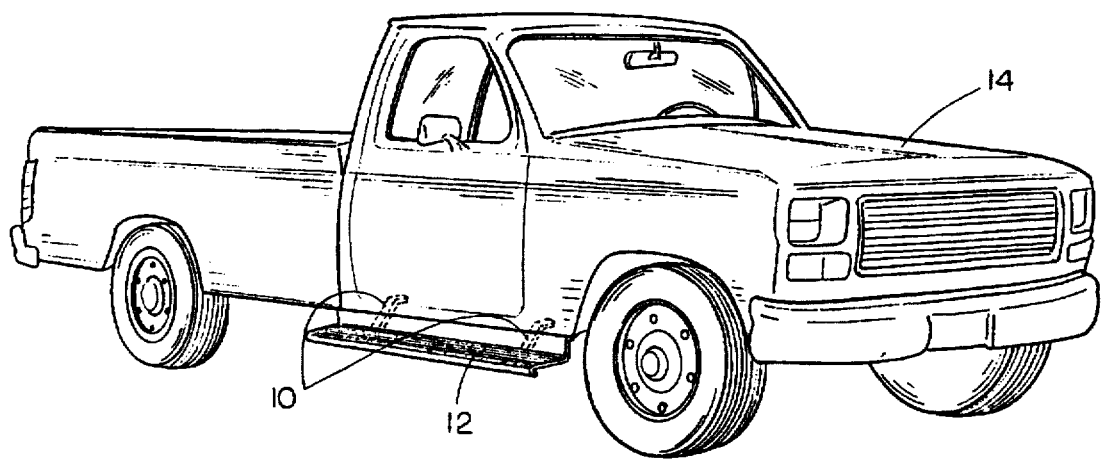
FIG. 1 is a perspective view of a vehicle having a running board attached thereto using the universal bracket of the present invention.

Referring now to the drawings, in which similar or corresponding parts are identified with the same reference numeral and more particularly to FIG. 1, a pair of universal brackets of the present invention are designated generally at 10 and shown in hidden lines supporting a running board 12 on a vehicle 14. While vehicle 14 is shown as a pickup in the drawings, it should be understood that both the vehicle and the particular running board may be of a wide variety of makes and styles.

Figure 2:
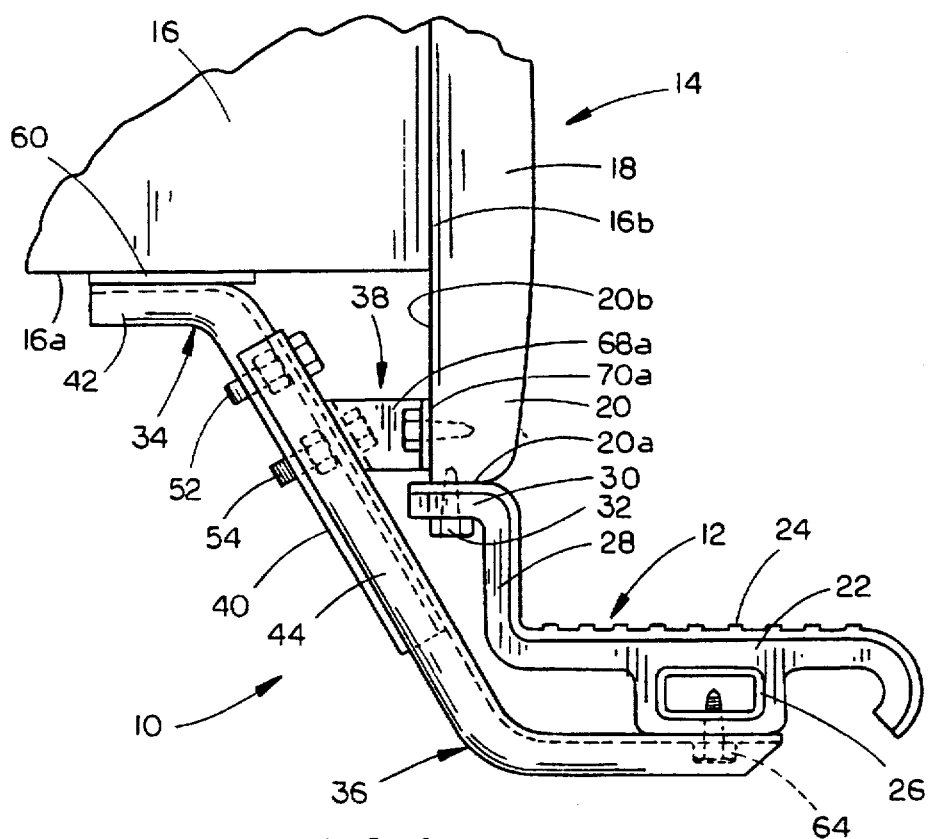
FIG. 2 is a side elevational view of the bracket of the present invention installed on a vehicle with a running board attached thereto.

Referring now to FIG. 2, bracket 10 is shown installed on vehicle 14 to support running board 12 in the desired position. Conventional vehicle 14 includes a floor board 16 having a bottom surface 16a, with a rocker panel 18 mounted on an outward side 16b of floor board 16. Rocker panel 18 includes a lower end 20 which projects downwardly below the bottom surface 16a of floor board 16. Rocker panel lower end 20 includes a bottom wall 20a and an inward wall 20b, to which the running board 12 and bracket 10 are attached respectively.

Running board 12 is of any conventional type and style which includes; a horizontally extending step portion 22 with a non-skid step pad 24 on an upper surface thereof. A steel tube 26 is molded onto the bottom of the step 22 of running board 12, and extends the length of the running board for structural support. A back wall 28 projects upwardly from the rearward edge of step 22, and has a rearwardly projecting flange 30 at the upper end thereof. A plurality of self-tapping screws 32 are inserted through flange 30 and into the bottom wall 20a of rocker panel lower end 20. Structural support for running board 12 is provided by brackets 10 as described in more detail hereinbelow.

Bracket 10 includes an upper leg 34 adjustably connected to a lower leg 36, with a hanger 38 supporting legs 34 and 36 on rocker panel 18. As shown in FIG. 4, upper leg 34 is a generally L-shaped channel having an elongated back 40 connected to a foot 42 at approximately a 45° angle. Similarly, lower leg 36 is a generally L-shaped channel with an elongated back 34 connected to a foot 46 at approximately a 45° angle. The backs 40 and 44 of upper and lower legs 34 and 36 each have a pair of longitudinally extending and aligned upper and lower slots 48 and 50, and 48' and 50', respectively. The backs 40 and 44 of upper and lower legs 34 and 36 are fastened together by a pair of bolts 52 and 54 journaled through slots 48 and 48', and 50 and 50' respectively, and fastened with nuts 56 and 58 respectively.

Upper and lower legs 34 and 36 are adjustably connected by bolts 52 and 54 with upper leg foot 42 projecting inwardly and lower leg foot 46 projecting outwardly, in parallel planes offset by the overall length of the two backs 40 and 44 which are secured together. In this way, the length between upper leg foot 42 and lower leg foot 46 may be selectively adjusted by sliding back 40 longitudinally relative to back 44, and then securing the backs together with bolts 52 and 54, as shown in FIG. 3. The length of the slots 48, 48', 50, and 50' permits selective adjustment of the distance between feet 42 and 46.

A resilient pad 60 is mounted on the top surface of upper leg foot 42 for contacting floor board 16, as shown in FIG. 2. A plurality of apertures 62a, 62b, and 62c are provided through lower leg foot 46, and are longitudinally spaced apart to receive an attachment screw 64 therethrough, to thereby connect the bracket to the tube 26 on the bottom of running board 12 (as shown in FIGS. 2, 3 and 4).

Referring once again to FIG. 4, hanger 38 is a generally U-shaped strap having a base 66 connecting one end of spaced apart parallel legs 68a and 68b, and a pair of co-planar wings 70a and 70b connected to the projecting free ends of legs 68a and 68b respectively. While wings 70a and 70b and legs 68a and 68b are vertically oriented members, base 66 is oriented in a plane offset from the vertical at an angle complimentary to the angle at which feet 42 and 46 are offset from their respective backs 40 and 44. In this way, wings 70a and 70b will be oriented in a vertical plane orthogonal to the planes of feet 42 and 46.

Hanger legs 68a and 68b have a length, as measured between base 66 and wings 70a and 70b greater than the combined thickness of backs 40 and 44 of legs 34 and 36. In this way, hanger 38 may be attached either on the upper/outward face 44a of back 44 (as shown in FIGS. 2 and 3), or may be attached to the rearward/lower side of back 40 of upper leg 34 (as shown by broken line 72 in FIG. 4). If hanger 38 is attached to the rearward side of upper leg 34, the combined thickness of backs 40 and 44 will be received between base 66 and wings 70a and 70b, such that wings 70a and 70b may be attached to the inward surface 20b of rocker panel 18.

Referring once again to FIG. 2, the first step in attaching a running board 12 to a vehicle 14 includes the step of temporarily holding the running board in the desired position with flange 30 in contact with the rocker panel roller end bottom wall 20a. Typically, each running board will be supported by two brackets 10 each bracket located towards each end of the running board. Each bracket 10 is then adjusted to achieve the proper fit. This fit is achieved by first locating hanger 38 with wings 70a and 70b in flush contact with the rocker panel inward wall 20b. Bolts 52 and 54 are loosened to permit adjustment of the length of backs 40 and 44, which in turn adjusts both vertical and horizontal lengths of bracket 10. The upper leg foot 42 should be positioned with pad 60 snugly against the floor board bottom surface 16a, while one of apertures 62a, 62b, or 62c (as shown in FIG. 3) is located generally centrally under tube 26 on the bottom of step 24 for securement by screw 64. If none of the apertures 62a, b, or c is located in the appropriate position under tube 26, hanger 38 may be fastened to the rearward/lower side of upper leg 34, to thereby horizontally adjust the location of bracket 10 relative to rocker panel 18 and running board 12.

Once the proper position and fit has been established, bolts 52 and 54 are tightened on bracket 10 to lock it in the desired configuration. The running board is then attached to rocker panel 18 by screwing screws 32 into the rocker panel bottom wall 20a. While holding a bracket 10 in position, a self-tapping screw 74 is journaled through apertures 76 in each wing 70a and 70b (shown in FIG. 4) to affix the hanger in position. Bolt 54 extends through an aperture 78 in base 66 of hanger 38 to secure the hanger on bracket 10 and to secure the bracket in position on rocker panel 18. Screws 64 are then threaded through the appropriate aperture 62a, 62b, or 62c and into the tube 26 on running board 12 to complete installation of the running boards.

Whereas the invention has been shown and described in connection with the preferred embodiment thereof, many modifications, substitutions and additions may be made which are within the intended broad scope of the appended claims.

I claim:

1. In combination:
    a vehicle having opposing side panels and opposing first and second rocker panels at the lower end of the side panels, the rocker panels each having an outward surface, a bottom wall, and an inward surface projecting generally vertically downwardly from a floor board of the vehicle;
    a pair of universal mounting brackets secured to the inward surface of said first rocker panel and spaced apart along a horizontal length of the first rocker panel;
    each said bracket including:
        an upper foot connected to an upper end of an adjustable length back, and extending generally horizontally inwardly from the back;
        a lower foot connected to a lower end of the back and extending generally horizontally outwardly from the back; and
        a hanger connected to the back and mounted on the first rocker panel inward surface with the lower foot projecting outwardly and below the rocker panel bottom wall and the upper foot projecting inwardly and under the vehicle and in contact with the vehicle floor board; and
    an elongated running board having a horizontally extending step portion and a vertically extending back wall, the running board step portion mounted on the lower feet of said brackets, and the running board back wall secured to the first rocker panel bottom wall.

2. The combination of claim 1, wherein said back is connected to the upper and lower feet at a non-orthogonal angle such that adjustment of the length of the back will move the lower foot both horizontally and vertically relative to the upper foot.

3. The combination of claim 1, wherein each said bracket includes:
    an upper generally L-shaped leg having a back portion and a foot portion, said upper foot forming the upper leg foot;
    a lower generally L-shaped leg having a back portion and a foot portion, said lower foot forming the lower leg foot; and
    fastener means selectively adjustably connecting the back portions of the upper and lower legs.

4. The combination of claim 1 wherein said upper leg back includes a longitudinally extending slot formed therein, wherein said lower leg back has an opening therethrough located for juxtaposition over the upper leg slot, and wherein said fastener means includes a bolt extending through the opening and slot and a nut on the bolt for securing the upper and lower legs together.

5. The combination of claim 4, wherein the lower leg opening is a longitudinally extending slot.

6. The combination of claim 1, wherein each said lower foot has an aperture formed therethrough and a screw journaled through the aperture and fastened to the running board supported on the lower feet, to secure the running board to the lower feet.

7. The combination of claim 1, further comprising a pad of resilient compressible material mounted on an upper surface of the upper foot and interposed between :the upper foot and vehicle floor.

8. The combination of claim 2, wherein said hanger includes a base connected to the backs of said legs, at least one leg projecting outwardly from the base, and a wing connected to an outward end of the hanger leg and oriented in a generally vertical plane, and further comprising a fastener securing said wing in flush contact with the inward surface of the rocker panel.

9. The combination of the claim 8, wherein said base is a plate mounted at an angle such that the plate lies in a plane parallel to the backs of the legs.

* * * * *